J. L. THOMSON.
MEANS FOR TEACHING SPELLING AND THE LIKE.
APPLICATION FILED JAN. 17, 1914.
1,099,324.
Patented June 9, 1914.
2 SHEETS—SHEET 1.
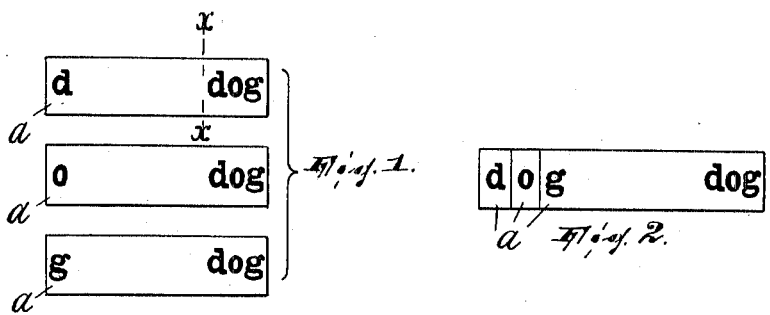
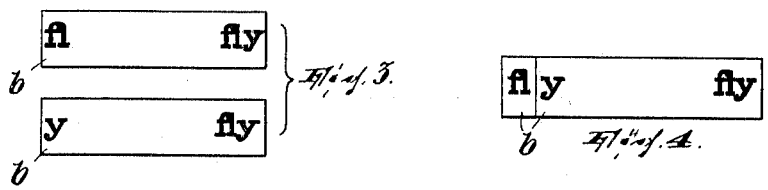
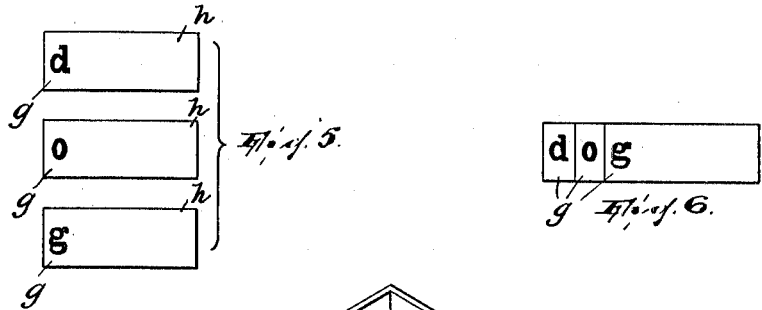
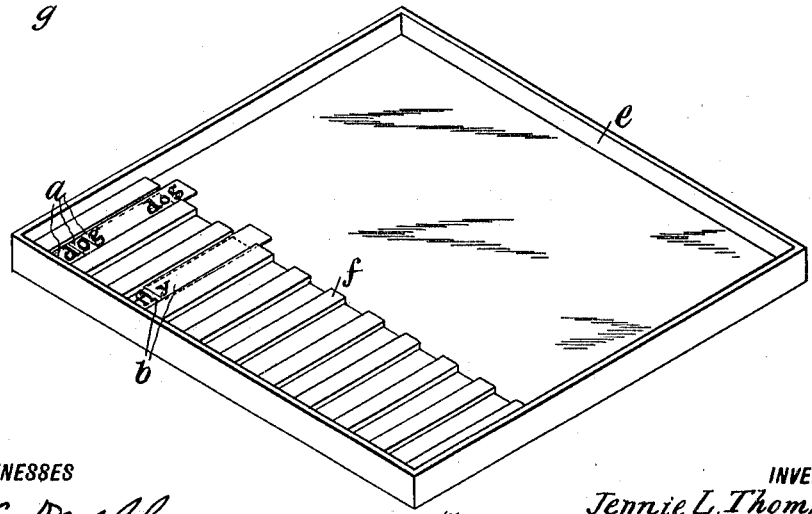
WITNESSES
INVENTOR,
Jennie L. Thomson,
BY
ATTORNEY.

J. L. THOMSON.
MEANS FOR TEACHING SPELLING AND THE LIKE.
APPLICATION FILED JAN. 17, 1914.

1,099,324.

Patented June 9, 1914.

2 SHEETS—SHEET 2.

| d | dog | g | fig | t | stove | u | jump |
|---|-----|---|-----|---|-------|---|------|
| o | dog | fi | fig | o | stove | m | jump |
| g | dog | g | fig | v | stove | p | jump |
| f | fly | b | box | e | stove | b | buzz |
| l | fly | o | box | q | quack | u | buzz |
| y | fly | x | box | u | quack | z | buzz |
| fl | fly | h | hen | a | quack | z | buzz |
| y | fly | e | hen | c | quack | r | row |
| f | fig | n | hen | k | quack | o | row |
| i | fig | s | stove | j | jump | w | row |

Fig. 8.

WITNESSES
Wm Bell.

INVENTOR,
Jennie L. Thomson,
BY
ATTORNEY.

UNITED STATES PATENT OFFICE.

JENNIE L. THOMSON, OF TUNKHANNOCK, PENNSYLVANIA.

MEANS FOR TEACHING SPELLING AND THE LIKE.

1,099,324.　　　　　Specification of Letters Patent.　　Patented June 9, 1914.

Application filed January 17, 1914. Serial No. 812,626.

*To all whom it may concern:*

Be it known that I, JENNIE L. THOMSON, a citizen of the United States, residing at Tunkhannock, in the county of Wyoming and State of Pennsylvania, have invented certain new and useful Improvements in Means for Teaching Spelling and the like, of which the following is a specification.

In teaching beginners the art of reading great difficulty is met with in inculcating in the mind of the learner not only that each spoken letter or element of a word has its counterpart in the printed or written form thereof, but that each such element in the printed or written form of the word possesses its own individuality and is employed in a variety of combinations with other letters or word elements to form other words. This is due to the fact that heretofore the method chosen is to exhibit to the pupil a selected word or words and bring the pupil to know the letters thereof by repeatedly spelling the word and at the same time designating the letters; and in consequence the pupil becomes so imbued with the specific association of any given letter with another or others in the selected word that his progress toward appreciating the individuality of the letters, and therefore of promptly recognizing any letter however it may be associated with other letters, is greatly retarded. Thus, a child might readily recognize "d" in "dog," if he had been taught to know "d" by reference to "dog," but fail to know the same letter in "pad," because it has new associates and a new position.

The principal object of this invention is to discourage "rote-work" by encouraging early in the beginner's mind appreciation of the individuality of the letters or elements of a printed or written word; in other words, to assist the beginner to quickly recognize a letter or other word element by reference primarily to itself alone. And in this connection it may be remarked that as the purpose is not merely to teach the beginner to know his letters, but to read, so it is a part of the principal object of this invention to inculcate in the beginner's mind, by reference to words, the office of the constituent letters or elements thereof.

I have graphically illustrated my invention in the accompanying drawings, wherein, Figures 1 to 4 show certain strips containing words and the letters thereof and representing the essential feature of my invention; Figs. 5 and 6 show other strips containing only letters and also representing the essential feature of my invention; Fig. 7 shows apparatus in connection with which said strips may be conveniently used; and, Fig. 8 shows a printed card from which the strips shown in Figs. 1 to 4 may be cut.

Preliminarily to describing my invention it may be said that in accordance with a system of teaching reading in connection with which I preferably employ the invention I select a few (say, ten) one-syllable words which will together embody all the letters of the alphabet and such other word-elements as, for instance, letters that are frequently coupled or joined in printing, such as "fi" and "fl." The teacher first chooses from these a word, say "dog," and repeatedly spelling the same and requiring the pupil to sound each letter as it is pronounced by the teacher finally impresses on the pupil that the word is composed of several certain elements that may be separately sounded. After having instilled in the mind of the pupil and impressed on his memory with respect to one or more of these words what those elements are, the teacher next resorts to my invention as an aid in fixing the idea that each of the elements so learned by sound has its counterpart in the visually observable form characteristic of printing any writing.

Describing, now, my invention in detail, each of the words to be taught is displayed on preferably flat pieces of suitable material, such as pasteboard, corresponding in number to the number of word-elements in each word. For instance, taking the word "dog," one set of the pieces would comprise three pieces; taking the word "fly" in the case where the "f" and "l" appear in printing coupled or joined, one set of pieces would comprise two pieces. It is not indispensable, although it is preferable, that in each set the selected word be displayed on each piece. On the several pieces of each set near the margins thereof are also displayed the different letters or elements of the word, one such element to a piece and the several elements being arranged in relative correspondence on all the pieces, by which I mean that, with the pieces in the position for reading the letters in the usual way, "right side up," the letters would occupy substantially the corresponding positions on all the pieces. In the preferred adaptation the pieces of a set are all of the same size and shape and are elongated, and the word is displayed on the right end of each piece, whereas the word-element is displayed at the left end thereof. The several word-elements being arranged in relative correspondence on all the pieces an index to the position in which each piece should stand for reading is afforded; and it is preferable, though not indispensable, that the word on each piece should be so positioned as to be read from the same side or edge thereof as the word element thereon is read. The letter or word-element is displayed at the left end and the word at the right end of the piece for a purpose which will appear. One set of three such pieces is shown in Figs. 1 and 2, designated $a$, and another of two in Figs. 3 and 4, designated $b$. It will be convenient to print cards, as $c$, Fig. 8, each having a complete complement of the words and their component elements displayed thereon in such manner that when the cards are severed on the lines $d$ as many series of the sets of pieces $a$ and $b$ described in detail above will be produced as there are cards; one series will then be given to each pupil, together with a shallow rectangular box, such as $e$, and an elongated transversely grooved holder, such as $f$, Fig. 7. The teacher now selects a set of the pieces, for instance, that displaying the word "dog," and, pronouncing the letters of the word in succession, designates the same on the strips or pieces $a$ with reference both to the word as displayed on the right end of each piece and to the constituent elements thereof at their left-hand ends. This is continued until the pupil perceives that each letter in the complete word has its counterpart in one of the letters individually shown on one of the pieces of the set. The pupil is then instructed to formulate the word himself by assembling the strips or pieces, placing them one after another in overlapping disposition, so that they will form the word displayed at the right-hand end of each strip. This is shown in Figs. 2 and 4 and also in Fig. 7, in which last instance the holder $f$ is shown at the left side of the box and affords in its grooves forms in which the strips may be placed by the pupil and maintained in orderly disposition, the adjacent side or wall of the box affording an abutment for the first strip and therefore serving to establish in the pupil's mind that it is essential in reading to proceed from left to right. Any other device which will afford a laterally extending abutment, such as the top or bottom side of any groove in this holder, against which one edge (top or bottom), as a gaging edge, of each strip may be placed may be utilized to assist the pupil to one of the essentials of reading—that the elements of each word are arranged in succession laterally of each other. When the pupil has been sufficiently drilled in the word "dog," for instance, so that he can choose from a number of the strips indiscriminately arranged, say in the free space of the box, the three whose word-elements are those of the word "dog" and can arrange them in the manner explained to form that word, another is chosen and the lesson continued in the same manner. It will be observed that in the process of formulating each word by the separated word elements the pupil always has before him on the set of pieces by which it may be composed (and, in the preferred form, on each piece) the same word-elements in proper arrangement to constitute such word—a circumstance affording both an assistance and an incentive to him. Having proceeded to an ability to "spell" each of a given number of words by selecting from all of the sets of strips or pieces, indiscriminately arranged, and properly placing those necessary to constitute each word, the pupil is next given one or more sets of pieces corresponding to those of the class shown in Figs. 1 to 4 excepting that the words are omitted therefrom. Thus, in Figs. 5 and 6, $g$ denotes the pieces or strips of such a set. They may be formed, if desired, by simply cutting away the ends of the pieces $a$ or $b$ on line $x$ in Fig. 1 but in any event the piece should be laterally elongated, the word-element being on one end thereof (preferably the left hand end). Not now having the complete word depicted on the pieces the child is told to formulate any given word in the same manner as before, i. e., by placing the pieces in overlapping disposition in such order as to form the selected word. In this part of the work it is of considerable assistance, as will be obvious, that the strips are laterally elongated and that the word-elements thereon are arranged so that each is at one end of its respective strip and all in relative correspondence on all the strips, leaving an extension $h$ to one side (the right side, in the present instance) of the word-element; for thereby the pupil is afforded a key to the proper placement of the piece for reading its word-element right-side up, especially in the cases of letters like "b" and "q" or "p" and "d," each of which it is difficult to distinguish from some other letter when inverted.

In the foregoing I have explained my invention with reference to substantially the first stage in the art of teaching reading, using words as an example of the type of written or printed matter to be taught and illustrating them in their printed forms. The invention has many other applications, as will be obvious, and may be continued as an auxiliary to the teacher's work beyond the primitive stage herein used as an example.

Having thus fully described my invention, what I claim as new and desire to secure by U. S. Letters Patent is:—

1. A set of flat pieces of suitable material having displayed respectively on them near the margin of each piece the different elements of a word, one such element to a piece, the several elements being arranged in relative correspondence on all the pieces, and one or more of such pieces also having displayed on each of them the complete word, substantially as and for the purpose set forth.

2. A set of flat pieces of suitable material of substantially the same shape and size having displayed respectively on them near the margin of each piece the different elements of a word, one such element to a piece, the several elements being arranged in respective correspondence on all the pieces, and one or more pieces having displayed on each of them the complete word, substantially as and for the purpose set forth.

3. A set of elongated flat pieces of suitable material of substantially the same shape and size having displayed respectively on them near one end of each piece the different elements of a word, one such element to a piece, the several elements being arranged in respective correspondence on all the pieces, and one or more pieces having displayed on each of them the complete word, substantially as and for the purpose set forth.

4. A set of elongated flat pieces of suitable material of substantially the same shape and size having displayed respectively on them near the left end of each piece the different elements of a word, one such element to a piece, the several elements being arranged in relative correspondence on all the pieces, substantially as and for the purpose set forth.

5. In combination, a set of flat pieces of suitable material of substantially the same shape and size having respectively displayed on them the different elements of a word, one such element to a piece, the several elements being arranged in relative correspondence on all the pieces, one of the edges of each piece which are above and below the word element thereon forming a laterally extending gage and such element being arranged adjacent one lateral edge of the piece, in combination with a holder having a laterally extending gaging abutment, said pieces being adapted to be placed with their gaging edges against the abutment in overlapping disposition with their word elements successively exposed.

In testimony whereof I affix my signature in presence of two witnesses.

JENNIE L. THOMSON.

Witnesses:
EVELYN HARDING,
MARY A. HARDING.

Copies of this patent may be obtained for five cents each, by addressing the "Commissioner of Patents, Washington, D. C."